United States Patent
Hinterstoisser et al.

(10) Patent No.: US 11,969,870 B2
(45) Date of Patent: Apr. 30, 2024

(54) PORTABLE POWER TOOL

(71) Applicant: Hilti Aktiengesellschaft, Schaan (LI)

(72) Inventors: Michael Hinterstoisser, Olching (DE); Jochen Erhardt, Klosterlechfeld (DE)

(73) Assignee: Hilti Akiengesellschaft, Schaan (LI)

( * ) Notice: Subject to any disclaimer, the term of this patent is extended or adjusted under 35 U.S.C. 154(b) by 481 days.

(21) Appl. No.: 17/281,319

(22) PCT Filed: Oct. 29, 2019

(86) PCT No.: PCT/EP2019/079525
§ 371 (c)(1),
(2) Date: Mar. 30, 2021

(87) PCT Pub. No.: WO2020/099123
PCT Pub. Date: May 22, 2020

(65) Prior Publication Data
US 2021/0402585 A1    Dec. 30, 2021

(30) Foreign Application Priority Data
Nov. 13, 2018    (EP) ..................................... 18205861

(51) Int. Cl.
*F16H 57/04*    (2010.01)
*B25F 5/00*    (2006.01)

(52) U.S. Cl.
CPC ......... *B25F 5/001* (2013.01); *F16H 57/0479* (2013.01)

(58) Field of Classification Search
USPC ....................................................... 173/216
See application file for complete search history.

(56) References Cited

U.S. PATENT DOCUMENTS

| | | | |
|---|---|---|---|
| 5,480,362 A | 1/1996 | Tanaka | |
| 5,976,048 A | 11/1999 | Sadau | |
| 9,803,742 B1 | 10/2017 | Raju et al. | |
| 2009/0242226 A1* | 10/2009 | Tokunaga | B25F 5/001 |
| | | | 173/178 |

FOREIGN PATENT DOCUMENTS

| | | |
|---|---|---|
| CN | 106678334 A | 5/2017 |
| CN | 206468772 U | 9/2017 |
| CN | 207034153 | 2/2018 |
| JP | 2606041 Y2 | 1/1995 |
| JP | 2003278847 A | 10/2003 |
| JP | 2003278894 A | 10/2003 |

OTHER PUBLICATIONS

International Search Report of PCT/EP2019/079525, dated Jan. 30, 2020

* cited by examiner

*Primary Examiner* — Chinyere J Rushing-Tucker
(74) *Attorney, Agent, or Firm* — Davidson, Davidson & Kappel, LLC

(57) ABSTRACT

A portable power tool 1 has a tool holder 2 for retaining a tool 3, a handle 7, an electric motor 4, and a drive train 10. The drive train couples the electric motor 4 to the tool holder 2. The drive train 10 contains a planetary transmission 11 with a planet carrier 13 and a plurality of planet gears 14. At least one of the planet gears 14 has a cylindrical cutout 30 and the planet carrier 13 has a collar 24 in the form of a circular arc that protrudes into the cutout 30.

16 Claims, 1 Drawing Sheet

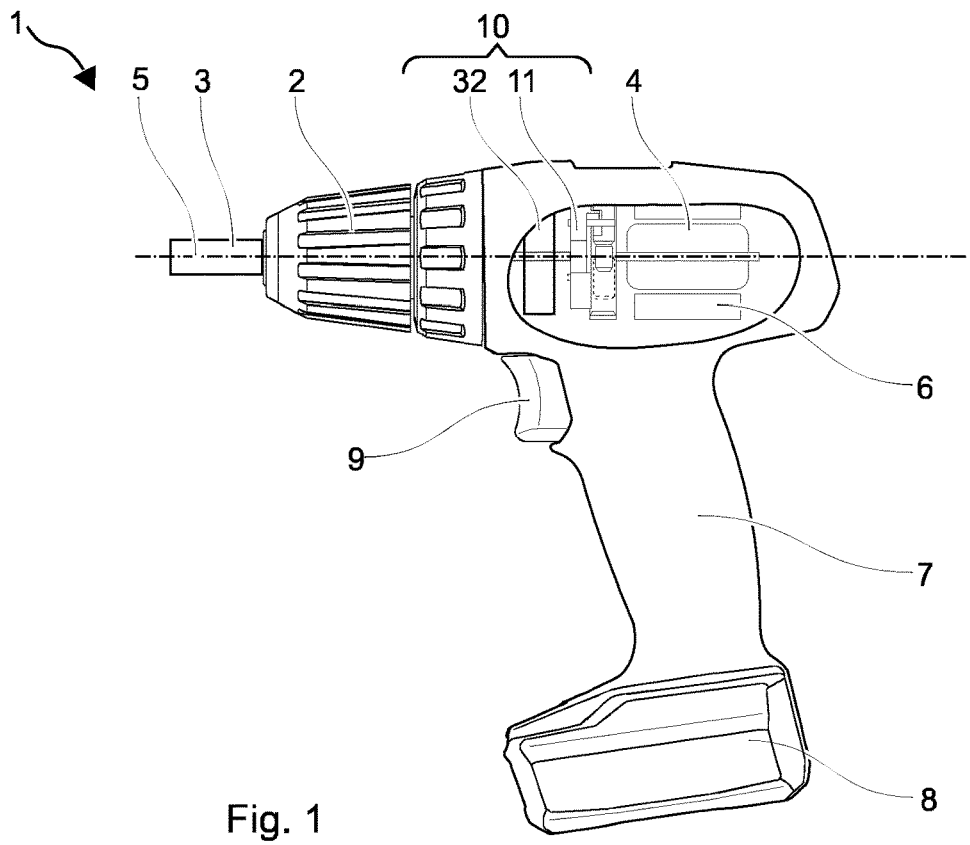
Fig. 1
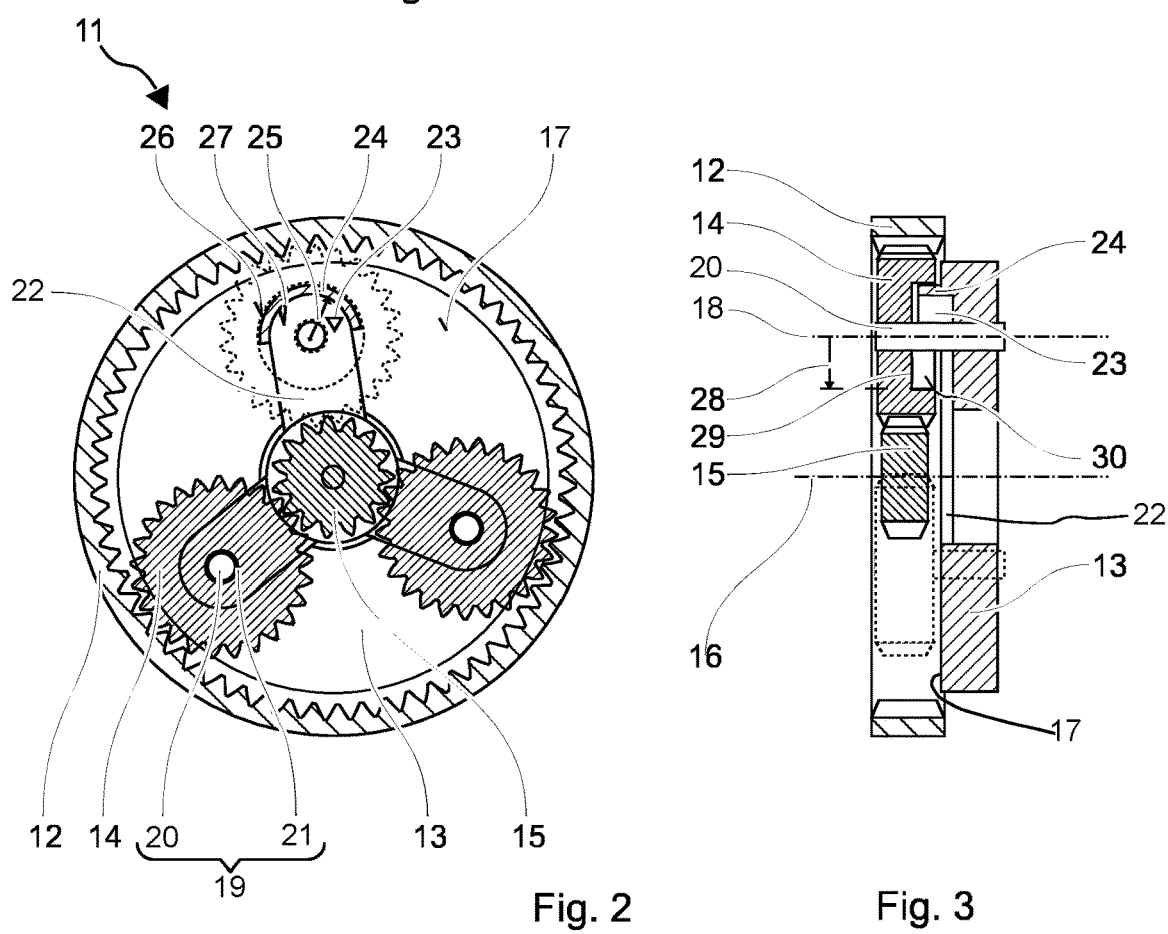
Fig. 2
Fig. 3

PORTABLE POWER TOOL

FIELD OF THE INVENTION

The present invention relates to a portable power tool having a planetary transmission.

The speed of the electric motor is stepped down by the planetary transmission and thus adapted to a desired speed of a tool holder. The individual moved components of the planetary transmission are wetted with a lubricant in order to reduce friction and wear. Centrifugal forces brought about by the rotating ring gear make it harder to reliably feed and meter the lubricant in the region of the planet gears.

SUMMARY OF THE INVENTION

The portable power tool according to the invention improves the lubrication of the planet gears.

The portable power tool has a tool holder for retaining a tool, a handle for holding and guiding the portable power tool, an electric motor, and a drive train. The drive train couples the electric motor to the tool holder. The drive train contains a planetary transmission with a planet carrier and a plurality of planet gears. At least one of the planet gears has a cylindrical cutout and the planet carrier has a collar in the form of a circular arc that protrudes into the cutout.

The cutout in the planet gear and the collar that engages in the cutout form an effective barrier for the lubricant, which counteracts the centrifugal force.

One configuration has a planet bearing for the at least one planet gear, wherein the collar is arranged at a radial distance from the planet bearing. Furthermore, the planetary transmission may have a ring gear, wherein the collar is arranged between the ring gear and the planet bearing.

In a preferred configuration, the collar encloses at least 120 degrees of the planet bearing and encloses at most 240 degrees of the planet bearing. The lubricant can enter through the open region, like a door, and is prevented from leaving by the collar.

In one configuration, the planet carrier is mounted so as to be rotatable about a main axis and the at least one planet gear is mounted so as to be rotatable about a bearing axis. The planet carrier has a channel extending from the main axis to the bearing axis. The lubricant can be fed via the main axis and distributed in the planetary transmission by centrifugal force. The channel may have a void.

BRIEF DESCRIPTION OF THE FIGURES

The following description explains the invention on the basis of exemplary embodiments and figures, in which:

FIG. 1 shows an electric screwdriver;

FIG. 2 shows a planetary transmission; and

FIG. 3 shows a longitudinal section through the planetary transmission

Identical or functionally identical elements are indicated by the same reference signs in the figures unless specified otherwise.

DETAILED DESCRIPTION

FIG. 1 shows an electric screwdriver as an example of a portable power tool 1. The portable power tool 1 has a tool holder 2 for retaining a tool 3. The tool 3 is for example a screwdriver bit, a drill bit or a grinding head. The user can insert the tool 3 into the tool holder 2 and lock it preferably manually. The tool holder 2 is driven by an electric motor 4. In the illustrated example, the tool holder 2 is driven in rotation about a working axis 5.

The portable power tool 1 has a machine housing 6 and a handle 7. The handle 7 is permanently connected to the machine housing 6. The user can hold the portable power tool 1 by the handle 7 and guide the portable power tool 1 during operation. The handle 7 has preferably an ergonomic shape adapted to the hand. The handle 7 is connected to a machine housing 6 in which the electric motor 4 is arranged. A battery pack 8 for powering the electric motor 4 is releasably fastened to the machine housing 6. Alternatively, the electric motor 4 can be powered via a grid connection. The portable power tool 1 has an operating switch 9, which is arranged preferably on the handle 7. The user can put the portable power tool 1 into operation by actuating the operating switch 9. Typically, the operating switch 9 is monostable and has to be kept pressed, otherwise the portable power tool 1 switches off.

The tool holder 2 is connected to the electric motor 4 via a drive train 10. The drive train 10 contains a planetary transmission 11. The planetary transmission 11 can adapt the speed and torque of the electric motor 4 to the desired speed and the desired torque for the tool 3. The exemplary planetary transmission 11 supports the speed.

The planetary transmission 11 has a gear stage that contains a ring gear 12, a planet carrier 13, a plurality of planet gears 14, and a sun gear 15. Although the following description is limited to the planetary transmission 11 with only one gear stage, a plurality of these gear stages or other gear stages can be connected in series.

The planetary transmission 11 has a main axis 16, with which the ring gear 12, the planet carrier 13, and the sun gear 15 are coaxially arranged. The planet carrier 13 is mounted so as to be rotatable about the main axis 16 independently of the ring gear 12 and the sun gear 15. The ring gear 12 and sun gear 15 preferably lie in one plane. The ring gear 12 and sun gear 15 are not directly engaged and are mounted so as to be rotatable about the main axis 16 relative to one another. The planet carrier 13 is arranged preferably along the main axis 16 in a manner offset with respect to the ring gear 12 and the sun gear 15. The planet carrier 13 is mounted so as to be rotatable about the main axis 16 and is not directly engaged with the ring gear 12 or with the sun gear 15. Accordingly, the planet carrier 13 can be rotated with respect to the ring gear 12 and the sun gear 15. Coupling between the ring gear 12, planet carrier 13 and sun gear 15 takes place via the three or more planet gears 14. The three or more planet gears 14 are arranged between and in the plane of the ring gear 12 and the sun gear 15. The planet gears 14 engage both with the ring gear 12 and with the sun gear 15 and therefore transmit torque from the ring gear 12 to the sun gear 15 and vice versa. The planet gears 14 are mounted on a (front) face 17 of the planet carrier 13. The planet gears 14 are mounted in planet bearings 19 so as to be rotatable about their (planetary) axles 18. The planet bearings 19 are arranged on the planet carrier 13. The planet bearings 19 are radially offset with respect to the main axis 16. In the illustrated example, the planet bearings 19 are arranged centrally between the ring gear 12 and the sun gear 15. The fixed attachment of the planetary axles 18 to the planet carrier 13 has the effect that, when the planet carrier 13 is rotated about the main axis 16, they are carried along eccentrically about the main axis 16. The planet carrier 13 can transmit a torque to the ring gear 12 and the sun gear 15 and vice versa in a manner coupled via the planet gears 14.

In the illustrated embodiment, the planetary transmission 11 is connected on the drive input side to the electric motor 4 by the sun gear 15 and is connected on the drive output side to the tool holder 2 by the planet carrier 13. The arrangement is only by way of example. The ring gear 12, planet carrier 13, and sun gear 15 can each be used as the drive output side or drive input side depending on the desired transmission ratio, design, and other considerations. Furthermore, the respectively third one of these elements can be coupled to the machine housing 6 in a rotationally fixed manner, be able to rotate freely about the main axis 16, or be coupled to the machine housing 6 via a brake or a switch mechanism. The illustrated teeth and the number thereof serve merely for illustration and do not necessarily correspond to an actual transmission ratio.

The illustrated planet bearing 19 contains a bearing journal 20 on the planet carrier 13 and a hub 21 in the planet gear 14. The bearing journal 20 protrudes from the front face 17 of the planet carrier 13 in the direction of the plane of the ring gear 12 and sun gear 15. The bearing journal 20 is arranged in a manner offset away from the main axis 16. In the example, the bearing journal 20 is arranged centrally between the ring gear 12 and the sun gear 15. A (bearing) axis 18 of the bearing journal 20 is parallel to the main axis 16. The bearing journal 20 can be connected rigidly to the planet carrier 13 or be mounted in the planet carrier 13 so as to be rotatable about the bearing axis 18. The hub 21 of the planet gear 14 fits in a rotatable manner on the bearing journal 20. In one configuration, the hub 21 can be connected rigidly to the bearing journal 20, wherein the bearing journal 20 is mounted in the planet carrier 13 so as to be rotatable about the bearing axis 18.

The planet carrier 13 has radially extending channels 22, which extend from the main axis 16 to the planet bearings 19. The channels 22 have been introduced as recesses in the front face 17 of the planet carrier 13. A depth of the channels 22 is less than a width of the channels 22, and so they can be produced using conventional sintering methods. The aspect ratio of depth to width is preferably less than 1:3. Depth denotes the dimension along the main axis 16 and width denotes a dimension measured both perpendicularly to the connecting line between the main axis 16 and bearing axis 18 and perpendicularly to the depth.

The planet bearing 19 is located preferably within the channel 22. One end of the channel 22 forms an annular void 23, which surrounds the bearing journal 20. The void 23 can be formed in a circular manner. The void 23 is recessed with respect to the front face 17.

For each planet bearing 19, the planet carrier 13 has a collar 24 in the form of a circular arc. The collar 24 protrudes along the main axis 16 with respect to the front face 17. The collar 24 can directly adjoin the void 23. The collar 24 extends at a radial distance 25 from the bearing axis 18. The cylindrical axis of the collar 24 and the bearing axis 18 accordingly coincide. The collar 24 has an (outer) surface 26 facing away from the bearing axis 18, and an (inner) surface 27 facing the collar 24. In the case of the collar 24 illustrated by way of example, the outer surface 26 and inner surface 27 are cylindrical. A thickness, i.e. a distance 25 from the outer surface 26 to the inner surface 27, of the collar 24 is constant. In another configuration, the outer surface 26 is still a portion of a cylinder with the radius 28 about the bearing axis 18, while the inner surface 27 has a different, preferably concave, shape and is spaced apart from the bearing axis 18.

The collar 24 is arranged in a radial direction between the ring gear 12 and the planet bearing 19. A mean distance of the collar 24 from the main axis 16 is accordingly greater than the distance of the bearing axis 18 from the main axis 16. The collar 24 covers an angular sector of at least 120 degrees, for example at least 150 degrees, for example at least 175 degrees. Preferably, the collar covers an angular sector of less than 240 degrees, for example less than 210 degrees, for example less than 185 degrees. The collar can be arranged in a mirror-symmetric manner to the connecting line between the main axis 16 and bearing axis 18. The collar 24 has an opening in the direction of the sun gear 15. A height of the collar 24 is less than the radius 28, preferably with an aspect ratio less than 1:3. The height denotes the dimension along the main axis 16.

The planet gears 14 can be formed in an identical manner. The description is limited by way of example to one of the planet gears 14. The planet gear 14 has a (rear) face 29 facing the planet carrier 13. Between the front face 17 of the planet carrier 13 and the rear face 29 of the planet gear 14 is an air gap. The two faces are not in contact with one another.

The planet gear 14 has a cylindrical cutout 30 in the rear face 29. The cylindrical cutout 30 has a radius 28 that corresponds to the radial distance 25 of the collar 24 from the bearing axis 18. A depth 31 of the cutout 30 corresponds to the height of the collar 24. The collar 24 projects into the cutout 30 of the planet gear 14. The radial dimensions have an element of play, and so the planet gear 14 is not in contact with the collar 24. The planet bearing 19 is preferably formed only by the bearing journal 20 and the hub 21.

The planet bearing 19 is wetted by a lubricant film. The lubricant is delivered from the main axis 16 to the bearing journal 20 by the centrifugal force. The collar 24 and the cylindrical cutout 30 form an effective barrier for the lubricant, said barrier preventing any ejection from the planet bearing 19 on account of the centrifugal force. The wetting of the main axis 16 can take place by way of a reservoir of lubricant outside the planetary transmission 11.

The illustrated planetary transmission 11 is illustrated with the sun gear 15 on the drive input side and the planet carrier 13 on the drive output side. In other configurations, one of the sun gear 15, planet carrier 13, and ring gear 12 can be coupled to the electric motor 4 on the drive input side. One of the two remaining elements of sun gear 15, planet carrier 13, and ring gear 12 is coupled to the tool holder 2 on the drive output side. The illustrated planetary transmission 11 contains only one gear stage. In alternative embodiments, a plurality of planetary stages can be interconnected. Each of the planetary stages can have a planet carrier 13 with the described collar 24, and corresponding planet gears 14 with the cylindrical cutout 30.

The use of the planetary transmission 11 in the illustrated electric screwdriver is by way of example. Other portable power tools having the planetary transmission include drilling machines, hammer drills, chipping hammers, circular saws, jigsaws, pendulum jigsaws, angle grinders, etc. The drive train 10 can other drive components 32 connected upstream or downstream of the planetary transmission 11. Examples of the drive components are a slip clutch, a tangential impact mechanism, an electro-pneumatic impact mechanism, a pendulum stroke mechanism, further gear stages, etc. Depending on the drive train 10, the tool holder 2 transmits to the tool 3 a continuously rotating movement, a pulse-like rotating movement, an axially striking movement, a pendulum movement or a superimposition of these movements.

What is claimed is:

1. A portable power tool comprising:
   a tool holder for retaining a tool;
   a handle for holding and guiding the portable power tool;

an electric motor;
a drive train coupling the electric motor to the tool holder, the drive train including a planetary transmission with a planet carrier and a plurality of planet gears;
at least one of the planet gears having a cylindrical cutout and the planet carrier having a collar in the form of a circular arc protruding into the cutout.

2. The portable power tool as recited in claim 1 further comprising a planet bearing for the at least one planet gear, wherein the collar is arranged at a radial distance from the planet bearing.

3. The portable power tool as recited in claim 2 wherein the planetary transmission has a ring gear, and the collar is arranged between the ring gear and the planet bearing.

4. The portable power tool as recited in claim 3 wherein the collar encloses at least 120 degrees of the planet bearing and encloses at most 240 degrees of the planet bearing.

5. The portable power tool as recited in claim 1 wherein the planet carrier is mounted so as to be rotatable about a main axis and the at least one planet gear is mounted so as to be rotatable about a bearing axis, the planet carrier having a channel extending from the main axis to the bearing axis.

6. The portable power tool as recited in claim 5 wherein the channel has a void.

7. The portable power tool as recited in claim 5 wherein the planet bearings are radially offset from the main axis.

8. The portable power tool as recited in claim 1 wherein the planetary transmission has a sun gear and a ring gear.

9. The portable power tool as recited in claim 8 wherein the planet carrier is mounted so as to be rotatable about a main axis independently of the ring gear and the sun gear.

10. The portable power tool as recited in claim 9 wherein the planet carrier is arranged along a main axis in a manner offset with respect to the ring gear and the sun gear.

11. The portable power tool as recited in claim 8 wherein a coupling between the ring gear, the planet carrier and the sun gear takes place via at least three planet gears of the plurality of planet gears.

12. The portable power tool as recited in claim 8 wherein the plurality of planet gears has at least three planet gears arranged between the ring gear and the sun gear.

13. The portable power tool as recited in claim 1 wherein the planet gears are mounted in planet bearings arranged on the planet carrier.

14. The portable power tool as recited in claim 13 wherein the planet gears are mounted in the planet bearings so as to be rotatable about planetary axles fixed to the planet carrier.

15. The portable power tool as recited in claim 1 wherein the planet gears are mounted on a face of the planet carrier.

16. The portable power tool as recited in claim 1 wherein a height of the collar is less than a radius of the cylindrical cutout with an aspect ratio of less than 1:3.

* * * * *